United States Patent
Blumenberg et al.

(10) Patent No.: US 9,423,268 B2
(45) Date of Patent: Aug. 23, 2016

(54) GRAPHICAL REPRESENTATION GENERATION FOR MULTIPLE POINTS OF INTEREST

(71) Applicant: APPLE INC., Cupertino, CA (US)

(72) Inventors: Christopher Blumenberg, San Francisco, CA (US); Marcel Van Os, Cupertino, CA (US); Mikio Inose, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/462,481

(22) Filed: Aug. 18, 2014

(65) Prior Publication Data

US 2015/0369623 A1    Dec. 24, 2015

Related U.S. Application Data

(60) Provisional application No. 62/015,235, filed on Jun. 20, 2014.

(51) Int. Cl.
| | |
|---|---|
| *G01C 21/00* | (2006.01) |
| *G08G 1/123* | (2006.01) |
| *G01C 21/36* | (2006.01) |
| *G01C 21/20* | (2006.01) |

(52) U.S. Cl.
CPC .............. *G01C 21/367* (2013.01); *G01C 21/20* (2013.01); *G01C 21/3682* (2013.01)

(58) Field of Classification Search
CPC ............. G01C 21/343; G01C 21/3679; G08G 1/096827; G08G 1/096888; H04L 67/18; H04L 67/22; H04L 67/24; H04N 1/00244; H04N 5/23222; H04N 5/23293

USPC ......... 701/532, 409, 446, 450, 455, 454, 461, 701/462; 340/995.1, 995.19, 995.12, 340/995.14, 990, 539.2
See application file for complete search history.

(56) References Cited

U.S. PATENT DOCUMENTS

| | | | |
|---|---|---|---|
| 8,335,990 | B2 | 12/2012 | Arrasvuori |
| 8,560,228 | B2 | 10/2013 | Feldbauer |
| 2004/0243306 | A1 | 12/2004 | Han |
| 2009/0055774 | A1 | 2/2009 | Joachim |
| 2009/0100363 | A1 | 4/2009 | Pegg et al. |
| 2011/0047509 | A1 | 2/2011 | Arrasvuori |
| 2012/0046861 | A1* | 2/2012 | Feldbauer ............ G09B 29/106 701/426 |

(Continued)

OTHER PUBLICATIONS

International Search Report and Written Opinion dated Oct. 1, 2015 for International Application No. PCT/US2015/025463, 15 pages.

*Primary Examiner* — Muhammad Shafi
(74) *Attorney, Agent, or Firm* — Kilpatrick Townsend & Stockton LLP

(57) ABSTRACT

An improve navigation application can generate and display a composite representation of multiple POIs when POI icons representing the POIs appear to be overlapping. Some embodiments display the composite representation when a certain zoom level is reached for a map including the multiple POI icons. In some embodiments, the navigation application can determine POIs that may be of interest to the user based on the user's attributes and activity history and generate the composite representation based on those attributes. The composite representation can include multiple POI icons that are displayed adjacent to each other such that a user of the navigation application can readily identify POIs that are likely to be of interest to the user within a region.

16 Claims, 10 Drawing Sheets

(56) References Cited

U.S. PATENT DOCUMENTS

| | | |
|---|---|---|
| 2013/0155181 A1 | 6/2013 | Williams et al. |
| 2013/0249812 A1 | 9/2013 | Ramos et al. |
| 2013/0321269 A1* | 12/2013 | Beaurepaire ....... G01C 21/3682 345/158 |
| 2014/0074395 A1 | 3/2014 | Brown |
| 2014/0320674 A1* | 10/2014 | Kuang ............... H04N 5/23222 348/207.1 |

* cited by examiner

GRAPHICAL REPRESENTATION GENERATION FOR MULTIPLE POINTS OF INTEREST

CROSS-REFERENCES TO RELATED APPLICATIONS

This application claims priority to and the benefit of U.S. Provisional Application No. 62/015,235, filed Jun. 20, 2014 and entitled "Graphical Representation Generation For Multiple Points Of Interest" the entire disclosure of which is herein incorporated by reference for all purposes.

BACKGROUND

The present disclosure relates generally to map-based applications for use in computer systems and in particular to generating and presenting a graphical representation for multiple points of interest (POIs).

Map-based services are commonly accessible via many types of computer systems, from desktops to handheld devices to navigation devices in vehicle systems. People are increasingly relying on map information provided by map-based services to get from one location to another. A map-based application can enable a user to view maps of different regions. In some instances, map-based applications can provide turn-by-turn instructions to a destination location. Various features provided by map-based applications can help a user navigate through unfamiliar territories. For instance, some map applications may identify street names or display visual blocks representing structural objects such as buildings or bridges in a three-dimensional view. Further, some map-based applications can display POIs to the user as part of the map information.

Map information provided by map-based applications is useful in providing users with a comprehensive understanding of an area. Users can identify POIs and view information pertaining to those POIs using the map information presentable by map-based applications. However, as the amount of information gathered within a given radius increases, displaying the large amounts of map information on display screens with limited sizes makes finding a particular location difficult. The names of the POIs or their relevant information may be truncated to a degree such that the user is unable to recognize the POI she is seeking. In some cases not all of the POI icons representing POIs may be visible due to the limited size of the display screen relative to the amount of map information being displayed. The large number of POI icons may become densely packed in an area such that the POI icons may no longer be identifiable from each other.

SUMMARY

Certain embodiments of the present invention can generate and display a composite POI (also referred to as a composite representation or graphical representation) that can easily and visually convey multiple POIs to a user. In some embodiments, a navigation application can display a map that includes multiple POI icons representing multiple POIs. Each POI may have a representative POI icon and text that can identify the POI. Depending on a map scale in which the map is being displayed, the navigation application may display one or more POI icons within an area where the POI icons are clearly distinguishable from each other. In some instances where the POI density is high or when the map is zoomed out, the POI icons may collide or even overlap each other. In those instances, the navigation application may generate a composite POI that includes a label and multiple icons where the label indicates the area in which the POIs are within and the multiple icons indicate information associated with the POIs.

Some embodiments can provide a method of displaying a composite representation for a region of interest (ROI) when one of more POI icons representing POIs within the ROI is colliding or overlapping. In some embodiments, a computing device may receive several graphical interface items where each of the graphical interface items corresponds to a POI. The computing device can display the several graphical interface items on a display of the computing device. The computing device can determine that the several graphical interface items are overlapping. The computing device can display a composite representation on the display of the computing device in response to determining that the several graphical interface items are overlapping. The composite representation can include several POI icons representing several POIs. In certain embodiments, the several POI icons can be displayed in an adjacent manner.

Certain embodiments can provide a method of generating a composite representation for display on a display of a computing device. In some embodiments, a server system that includes one or more servers can determine several graphical interface items where each of the graphical interface items corresponds to a POI in a map. The one or more servers can determine that some of the graphical interface items are overlapping e.g., when a map scale or a zoom level associated with the map has changed. The one or more servers can generate a composite representation that represents several POIs in response to determining that the graphical interface items are overlapping. The composite representation can be generated based at least in part upon one or more priority weightings (also referred to as importance values) associated with one or more of the POIs. The one or more servers can then cause the generated composite representation to be displayed on the display of the computing device.

Other embodiments are directed to systems, portable consumer devices, and computer readable media associated with methods described herein.

BRIEF DESCRIPTION OF THE DRAWINGS

Various embodiments in accordance with the present disclosure will be described with reference to the drawings, in which.

DETAILED DESCRIPTION

Figure 1:
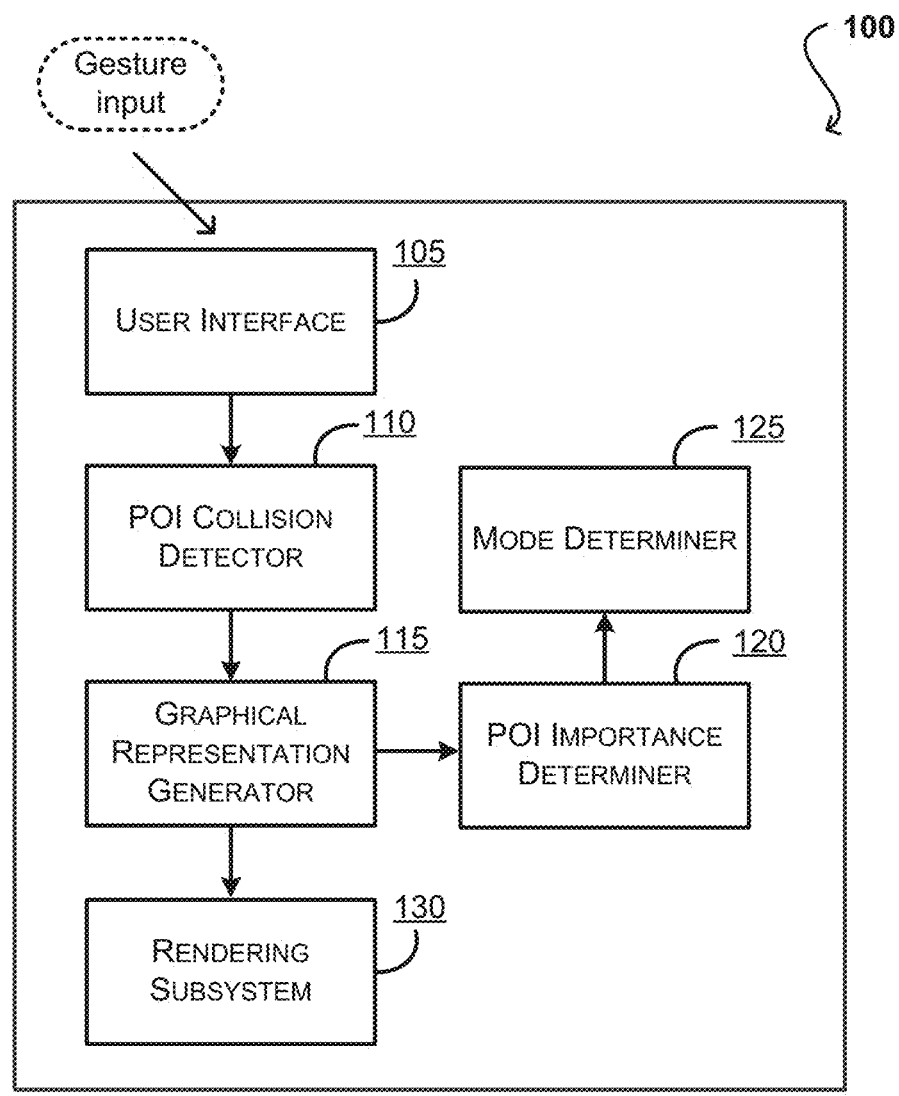
FIG. 1 is a schematic block diagram illustrating a system of some embodiments that may be configured to present a graphical representation of one or more points of interest when icons representing points of interest may be overlapping or colliding.

In the following description, for the purposes of explanation, specific details are set forth in order to provide a thorough understanding of embodiments of the invention. However, it will be apparent that various embodiments may be practiced without these specific details.

Certain embodiments of the present invention can determine when icons representing POIs displayed on a map in a graphical interface collide to cause a substituting graphical representation to be displayed. Overlapping or colliding icons can cause a map application to appear cluttered or confusing. Embodiments can generate and display a graphical composite representation that includes a label and several icons adjacent to each other. In some embodiments, the several icons can represent several POIs. The label can indicate a POI, an ROI, an area of interest, or a location that encompasses the several POIs. In one example, the area or location of interest can be a commuter railroad terminal and the label can be the terminal's name (e.g., Grand Central Terminal). The icons can represent the different logos of the trains that serve the terminal. In certain embodiments, the icons can be prioritized based on parameters such as user ridership or importance level and be displayed in a row such that each icon may be visibly conveyed to the user. In some embodiments, additional icons may be present at the terminal, each representing services available at the terminal (e.g., a coffee shop, a restaurant, etc.).

In some embodiments, the level of importance of certain points of interest to a user can be learned from the user's behavior. For example, the user may tend to ride trains that are associated with a certain agency. Therefore, the navigation application may list those train lines associated with the certain agency first in the graphical representation. In another example, the user may tend to visit coffee shops as opposed to pharmacies; therefore, the navigation application may generate and display a graphical representation that puts the coffee shop logos before the pharmacy logos. The navigation application can monitor the user's past activities and behavior to appropriately identify those POIs that might be of higher importance to the user.

In some embodiments, the map-based application can generate and display the graphical representation for a region when two or more icons representing two or more points of interests within the region are overlapping. Some embodiments may determine that two or more icons are overlapping when the center of the icon is equal or less than a threshold distance away from the center of another icon. Certain embodiments may determine that two or more icons are overlapping or colliding when the region that encompasses the two or more icons is at or below a zoom level. In some embodiments, however, different regions may be associated with different zoom levels such that the different regions may switch to the graphical representation display at different zoom levels. Once a region switches to the graphical representation display mode, one or more icons representing one or more points of interests within the region can be made visible to the user along with a label for the region.

In some embodiments, depending on an importance level of a POI, the POI may or may not be collapsed into the graphical representation when icons are overlapping. Some embodiments may display the POI separately in addition to the graphical representation when the POI is determined to be of high importance. In certain embodiments, when the map-based application determines to display a graphical representation for a region or an area of interest, the importance level of each POI can be determined. The map-based application may continue to display the icon representing a POI if the POI has been determined to have an importance level exceeding a threshold value.

In some embodiments, the navigation application has different navigation modes in which different types of information may be determined to be more important and thus presented to the user. For example, when the navigation application is in a transit mode, the importance level of certain points of interests such as bus stops or subway lines may increase. As such, those points of interests with a higher importance level may not be collapsed along with other points of interest into the graphical representation, but displayed separately and in addition to the graphical representation.

Different embodiments may display the graphical representation differently. In some embodiments, the graphical representation can include a label and multiple icons representing different points of interests. The different points of interest can be at least a subset of the points of interests that fall under the region being represented by the label. Some embodiments may display a text portion or a badge indicator along with each icon. The badge indicator may indicate a number of points of interest that fall under the category represented by the icon. Further, some embodiments may include additional badge indicators that enable a user to remove the particular category represented by the icon from being displayed as part of the graphical representation. As described, the navigation application can prioritize the icons and display the icons in an order. The order of display can be determined based on a combination of popularity levels associated with the points of interests, importance levels associated with the points of interests pre-configured by a developer, a mode that the navigation application is in (e.g., a shopping mode, a driving mode, a walking mode), the time of the day, the level of importance to the user, etc.

Various embodiments will now be discussed in greater detail with reference to the accompanying figures, beginning with FIG. 1.

I. System Overview

FIG. 1 is a schematic block diagram illustrating a system 100 (also referred to as an apparatus 100 or an electronic device 100) of some embodiments that may be configured to present a graphical representation of one or more points of interest when icons representing points of interest may be overlapping or colliding. System 100 can be, for example, a desktop computer, a laptop computer, a tablet computer, a smartphone, a mobile phone, a media player, a game console, or any combination of computing devices. As shown in this example, system 100 in some embodiments can include a user interface 105, a POI collision detector 110, a graphical representation generator 115, a POI importance determiner 120, a mode determiner 125, and a rendering subsystem 130.

Certain embodiments can provide a navigation application that can generate and display a graphical representation of multiple points of interests when icons corresponding to the points of interests appear to be overlapping. The navigation application can provide user interface 105 that can present a map including one or more regions. The region may be a POI and can include multiple points of interest. For example, a region such as a shopping complex can include multiple points of interest such as a restaurant, a grocery store, a clothing store, a post office, etc. In some embodiments, the POIs can be represented by a pin, an icon, text or a combination thereof that can be selectable by a user in some instances. User interface 105 can receive input from a user such as a touch or gesture input that corresponds to a selection, pan, zoom, or rotate command. User interface 105 can also receive other types of input from the user including voice or movement (e.g., eye ball movement or facial expression change).

In some embodiments, system 100 includes POI collision detector 110 that can determine whether to switch the display mode for the POI. Different embodiments may trigger the change in display mode differently. In certain embodiments, the display mode for the POI can be switched when icons of two or more POIs within a region is colliding or overlapping. Some embodiments determine that the display mode for the POI can be switched when the region or the map is being presented at or below a threshold zoom level. In some embodiments, each region may have a corresponding zoom level at which the change in display mode may be triggered. For example, some embodiments may change the display mode for Shibuya train station when the zoom level is at 50% while the display mode for Penn station may be changed when the zoom level is at 70%.

System 100 can also include graphical representation generator 115 that can generate a graphical representation when POI collision detector 110 has determined that a change in the display mode is needed. In some embodiments, the graphical representation can include a label for a region and one or more icons that represent POIs in the region. For example, the graphical representation at Penn Station can include a label "Penn Station" and multiple icons that are logos representing the different transit lines available at Penn Station, such as the logos for the New Jersey Transit, the Metro, etc. In some embodiments, the icons in the graphical representation can be ordered based on a priority weighting. The icons can be displayed in a manner that can convey the relative importance of POIs to a user.

System 100 can include POI importance determiner 120 that can determine a priority weighting (e.g., calculate an importance value) for each POI presented on the graphical interface. POI importance determiner 120 can determine an importance value for a POI by learning the user's past activities and behavior such that the navigation application can score certain POIs higher. For instance, if a user typically drinks coffee in the early mornings on a regular basis, navigation application may give coffee shops a higher importance value. In some embodiments, POIs exceeding a certain threshold value do not become collapsed under the graphical representation for the region. Instead, those POIs may be displayed in conjunction with the graphical representation.

System 100 can include mode determiner 125 that can determine a navigation mode currently associated with the user's device. Mode determiner 125 can determine the navigation mode by collecting data on the user's past behavior and determining the navigation mode based on a pattern from the user's past behavior. For instance, if the user regularly drives home after work around 6 PM, then the navigation application may determine that the navigation mode is a driving mode on a typical work day at 6 PM.

In some embodiments, POI importance determiner 120 can determine an importance value for a POI based on a current navigation mode of the navigation application. Upon determining a current navigation mode, the navigation application can assign a higher importance score (or weighting) to those POIs that are associated with the navigation mode. For example, the navigation application can determine that the navigation application is in a tourist mode and the user's current location is San Francisco, Calif. The navigation application may assign a higher importance value to locations that tourists may generally be interested in, such as Fisherman's Wharf, Philz coffee inside the Ferry Building, etc.

System 100 can include a rendering subsystem 130 that enables system 100 to render graphical user interfaces and/or other graphics. Rendering subsystem 130 can operate alone or in combination with other modules of system 100 in rendering one or more of the user interfaces presented by system 100. For instance, rendering subsystem 130 can communicate with and periodically poll other modules in system 100 (e.g., graphical representation generator 115) for updated information to update contents of one or more user interfaces displayed by system 100. In some embodiments, various modules of system 100 can continually provide updated information to rendering subsystem 130 to update the user interfaces displayed by system 100.

System 100 can generate and display a graphical representation of multiple points of interests when icons corresponding to the points of interests appear to be overlapping. In some embodiments, a map with regions can be displayed on user interface 105. The navigation application can receive user input (e.g., a zoom-type gesture, a pan-type gesture, etc.) via user interface 105. In some embodiments, the user input can cause certain regions to be zoomed in or out such that icons of points of interest can appear to be overlapping or colliding.

POI collision detector 110 can detect whether to enter a modified display mode where a graphical representation of multiple points of interest is displayed. As described, POI collision detector 110 may determine that the modified display mode has been triggered to cause the interface to display a graphical representation when a number of pixels between two or more icons fall below a threshold value or when the map is being displayed below a threshold zoom level (e.g., preset by a user, preset by an administrator).

When POI collision detector 110 determines that the modified display mode has been triggered for a region, graphical representation generator 115 can generate a graphical representation to be displayed. To generate a graphical representation, graphical representation generator 115 can cause POI importance determiner 120 to determine the importance of each POI within the region. POI importance determiner 120 can assess the importance for each of the POIs within the region based on the user's past activities and behavior.

Based on prior activity history of the user, POI importance determiner 120 may identify those POIs that were frequented by the user or the types of POIs that were frequented by the user. For example, the user may frequently visit a particular electronics store, regardless of what region the store is located. As such, POI importance determiner 120 may score the store with a higher importance value. In another example, the user may frequently visit a type of POI such as fast food restaurants. As such, POI importance determiner may score restaurants that fall under the fast foods category with a higher importance value. In some embodiments, the user may preconfigure the user's preferences setting such that POI importance determiner 120 may score POIs based on the additional parameter of the user's preferences.

In some embodiments, POI importance determiner 120 can determine the importance of a POI to a user based at least partially upon a current mode of the navigation application. Mode determiner 125 can determine the current mode of the navigation application based on user's past activities and behavior. In some embodiments, the user can designate the current navigation mode by making a selection within navigation application or in system preferences.

After mode determiner 125 determines a navigation mode, POI importance determiner 120 can score POIs based on how relevant a POI is for a particular navigation mode. For instance, different types of transportation such as transit lines for trains and buses can be important and useful to a user who is looking for transportation. When the navigation application is determined to be in a transit mode, POI importance determiner 120 can score transportation-related POIs with higher importance values.

Graphical representation generator 115 can generate the graphical representation based on importance values for POIs derived from POI importance determiner 120. In some embodiments, graphical representation generator 115 can generate a graphical representation that includes several icons representing different POIs. The different POIs can be prioritized and ordered based on importance values obtained from POI importance determiner 120. For instance, the more important or the higher ranked POIs can be displayed from left to right, or from top to bottom, etc. In certain embodiments, the graphical representation may not include more than a threshold number of icons. Some embodiments may not display icons representing POIs that do not have an importance score above a threshold value. Different embodiments may use the importance values obtained from POI importance determiner 120 differently. Rendering subsystem 130 can then render the graphical representation generated by graphical representation generator 115.

II. Flow Overview and Examples on Presenting a Composite Representation

Some embodiments can generate and present a graphical composite representation for multiple POIs in a region when an alternate display mode has been triggered (e.g., when two or more icons representing POIs are overlapping each other). In some embodiments, the navigation application can dynamically combine multiple POI icons into a graphical representation where the graphical representation can visibly convey the POIs that may be of interest to a user within the region. As such, when the navigation application is displaying the region using the alternate display mode, relevant POIs may be readily viewed by the user without requiring the user to perform additional actions (e.g., selections, hovering over an area, etc.). When the navigation application is no longer in the alternate display mode, the navigation application may dynamically switch the display of POI icons back to displaying the individual POI icons at their respective locations.

Figure 2:
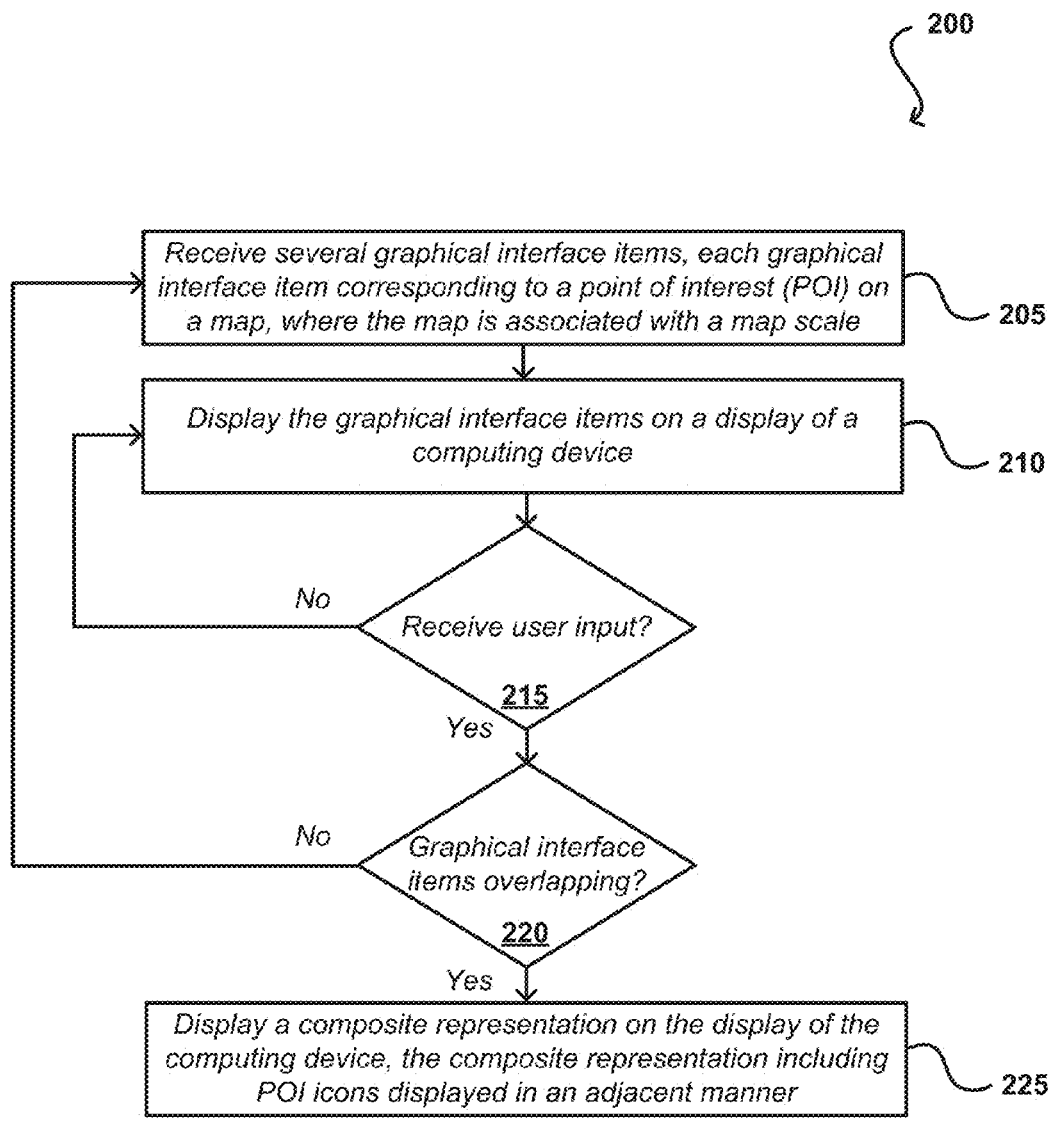
FIG. 2 is a flow diagram of illustrative process of some embodiments for displaying a graphical representation of multiple POI icons differently when POI icons may be overlapping each other.

FIG. 2 is a flow diagram of illustrative process 200 of some embodiments for displaying a graphical representation of multiple POI icons differently when POI icons may be overlapping each other. In certain embodiments, the graphical representation may be displayed when several POI icons are overlapping or colliding. In some embodiments, the graphical representation may be displayed when one or more POIs or map regions are being displayed below or beyond a threshold zoom level. Different embodiments may cause the graphical representation to be displayed upon different triggers.

Process 200 can be performed by a single device (e.g., system 100 in FIG. 1) including a client device or a server device or any suitable combination of devices. Process 200 will be described by reference to FIG. 3, which illustrates an example sequence of screen images of GUI 300 for an electronic device 305 in triggering and presenting a graphical representation. Electronic device 305 can execute a navigation application of some embodiments and dynamically display a graphical representation when two POI icons overlap.

GUI 300 can include a map 310 that includes several POI icons 315-335 representing different POIs. In some instances such as in FIG. 3, the POIs can also be transportations of interest where each POI icon represents a different transit agency for different transportation services. In some embodiments, the different POIs can be associated with a region of interest (ROI) 340. In this example, ROI 340 is a terminal that hosts several commuter services represented by POI icons 315-335. In certain embodiments, additional POI icons may be displayed, such as POI icons representing different restaurants, pharmacies, movie theaters, post offices within map 310.

At block 205 of FIG. 2, process 200 can receive one or more graphical interface items where each of the graphical interface items corresponds to a POI in a map. In some embodiments, the map can be displayed on the graphical interface at an initial map scale or zoom level. In certain embodiments, a user may launch a navigation application on the user's computing device (e.g., system 100 in FIG. 1) for example by selecting an icon representing the navigation application on a desktop or home screen of the system interface. Upon launching the navigation application on the user's device, the navigation application may determine a location (e.g., a current location, a recently-visited location, a destination location) and receive map information including several graphical interface items corresponding to multiple POIs in a map where the POIs are within the vicinity of the location. The location can be a POI, a ROI, or other types of area that is identifiable by a map. In some embodiments, map information can also include information on each POI within the map (e.g., ratings, description, hours of operation, phone number, importance level, and categorization), map image data, and other map-related data.

At block 210, process 200 can display the graphical interface items on a display of a computing device. In certain embodiments, the graphical interface items can include one or more logos or icons and a text label. In some embodiments, a graphical interface item may simply be a logo or icon that represents a POI. Using the received map information, the navigation application can determine, based on the determined location, an initial region for the map to be displayed. The initial region may include the multiple POIs that are within the vicinity of the determined location. The navigation application can then display a map including the one or more POIs specified by the map information. As shown in stage 345 of FIG. 3, graphical interface items 315-335 can be displayed on GUI 300 that is part of a software application (e.g., a navigation application).

At block 215 of FIG. 2, process 200 can determine whether a user input (e.g., a gesture input) directed to the map has been received. The user input can correspond to a selection, a panning operation, a zooming operation, a rotating operation, etc. Depending on the type of input, the navigation application may perform different operations. For instance, if the input is a panning gesture, the navigation application may retrieve additional map information corresponding to the new area resulted from or directed to by the panning gesture. In another instance, the input may correspond to a zoom type gesture that causes a change in the map scale associated with the map. If the input corresponds to a zoom operation, the navigation application may retrieve additional map information such as additional POI icons based on the new map scale. If process 200 determines that an input has not been received, then process 200 returns to block 210 to continue to display the graphical interface items on the display of the computing device.

At block 220, if an input has been received, process 200 can determine whether the graphical interface items (e.g., POI icons) are overlapping or colliding. In some embodiments, the navigation application can determine that some of the graphical interface items on a graphical interface are overlapping or colliding when a number of pixels between two POI icons fall below a threshold value. Some embodiments determine that the icons appear to be overlapping based on a zoom level (e.g., preset by a user, preconfigured by a system administrator). In certain embodiments, each ROI can be associated with a different zoom threshold (e.g., specified by a system administrator or operator) such that the alternate display mode associated with the ROI can be triggered upon reaching the zoom level associated with the particular ROI.

Figure 3:
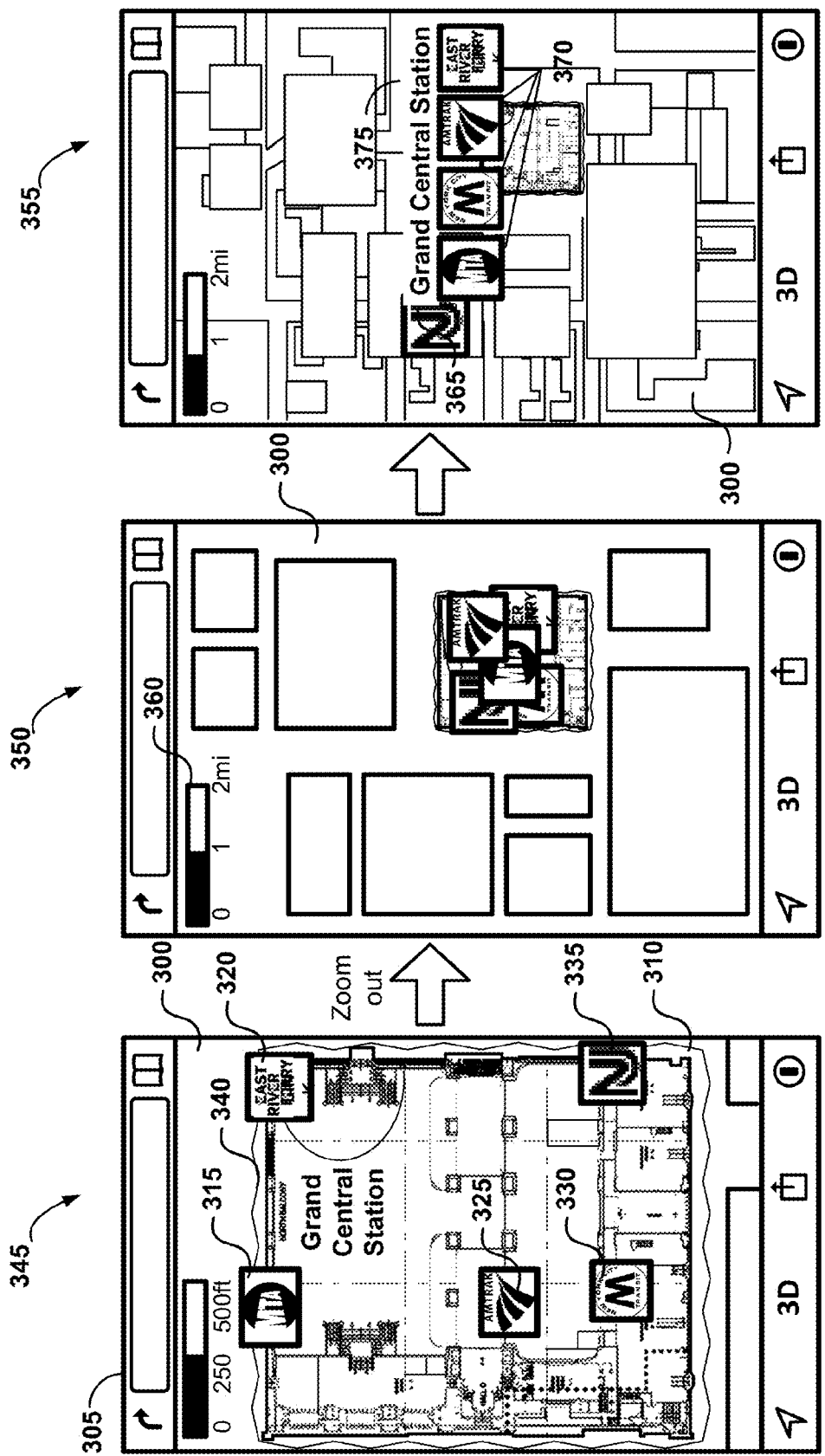
FIG. 3 illustrates an example sequence of screen images of a GUI for an electronic device in triggering and presenting a graphical representation.

As shown in stage 350 of FIG. 3, GUI 300 has zoomed out. The map scale can be indicated by the map scale meter 360. As the zoom level is lowered, the user can see a higher level of structures within the vicinity. However, POI icons 315-335 begin to collide and overlap. In some instances, the POI icons are no longer recognizable. In other instances, the POI icons may completely overlap each other such that the user may be unaware of an existence of a POI in the region.

Returning to FIG. 2, at block 225, process 200 can display a composite representation on the display of the computing device. The composite representation can include POI icons displayed in an adjacent manner in some embodiments. The navigation application can display the composite representation for a ROI that includes multiple POIs instead of the individual POI icons when an alternate display mode has been triggered for the POI. As described, the alternate display mode for the ROI can be triggered when two or more icons associated with the multiple POIs collide or overlap. In some embodiments, the alternate display mode for the POI can be triggered when the zoom level is at or below a threshold level. In certain embodiments, the threshold level at which the alternate display mode can be triggered may be different for different POIs. For instance, the alternate display mode for an ROI may be triggered at a threshold value higher than for another ROI. In certain embodiments, the alternate display mode for the POI can be triggered when the zoom level for a map or the map scale (ratio of a distance on the map to a corresponding distance on ground) falls below a threshold value or ratio, regardless of whether the icons overlap or not.

In some embodiments, the composite representation is only displayed when the zoom level is at or below a threshold level. When the zoom level is readjusted to be above a certain threshold level, the navigation application may no longer display the composite representation. Further, in some embodiments, when the zoom level is at or below another threshold level, the navigation application may display only the label of the ROI.

As shown in stage 355 of FIG. 3, GUI 300 displays a composite representation 375 that includes a label 365 and four icons 370. In some embodiments, the composite representation may include all the POI icons representing all the POIs within the ROI. In certain embodiments, the composite representation may display only a number of POI icons up to a threshold number (e.g., specified by a user or a system administrator). The POI icons may be displayed in an adjacent manner such that each POI icon is readily visible by the user, regardless of the zoomed out state of the map or the map scale. Different embodiments may display the POI icons in different manners so long as the icons are readily visible. As such, the user need not perform additional selections or actions (e.g., a hovering over a particular area or region in the map) in order to make the icons visible and readily accessible to the user.

In some embodiments, the composite representation may display POI icons in an order (e.g., from left to right, from top to bottom) based on an importance level (e.g., importance to the user, importance to the general public), a preference level (e.g., preference of a user), or an interest level (e.g., likelihood of interest to a user). For instance, the navigation application may determine that certain types of transportation or certain transit agencies in the transit scenario may have a higher level of importance compared to others. As such, the navigation application may present the POI icons corresponding to those transit agencies or types of transportation in an order in accordance with the level of importance. The level of importance or the level of preference may be determined based on any of a number of factors, such as general ridership, a frequency in which the user would ride with certain agencies or certain types of transportation, etc. Further, some embodiments may only display POI icons for POIs that have an importance level beyond a threshold value.

Figure 4:
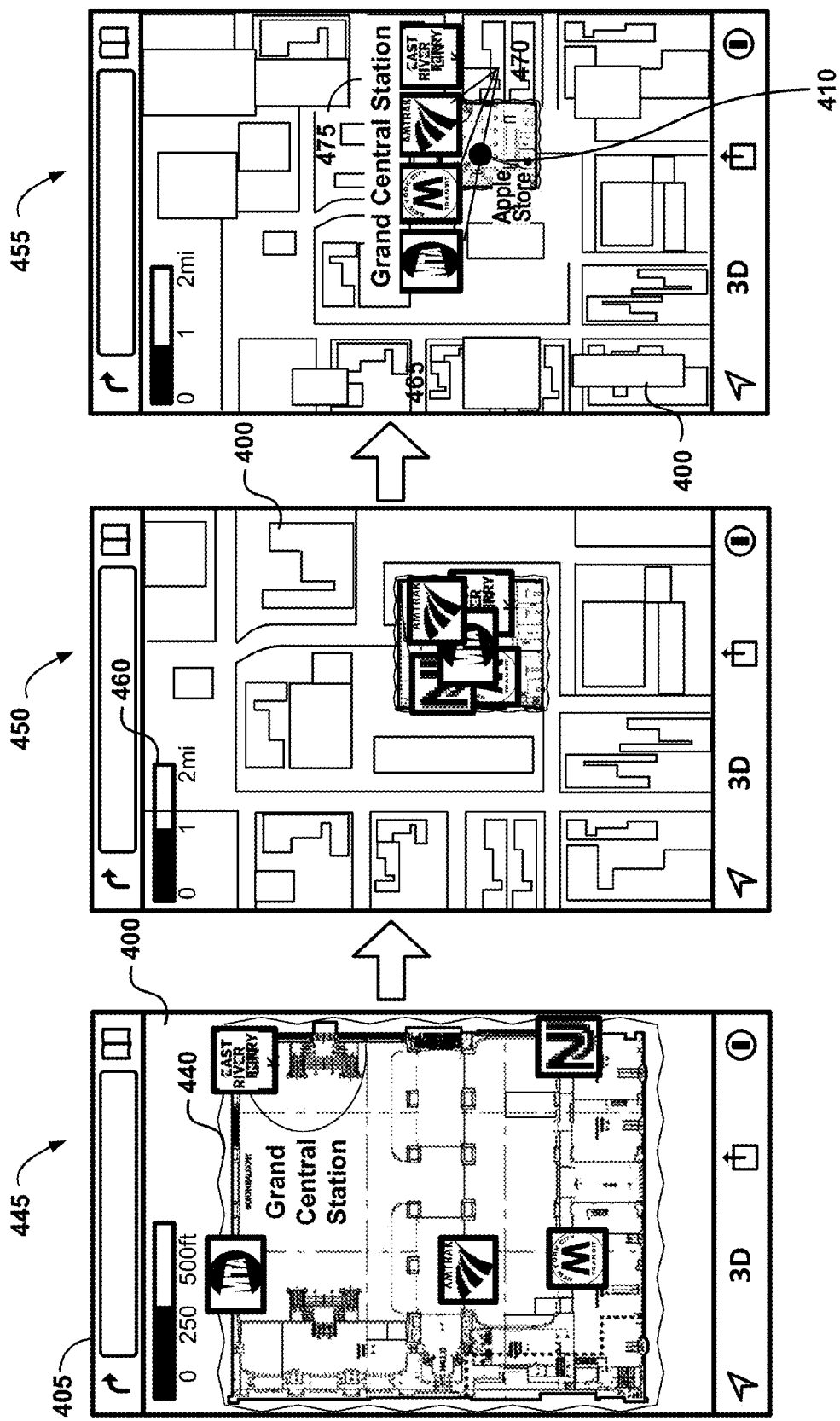
FIG. 4 illustrates an example sequence of screen images of a GUI for an electronic device in displaying a POI icon representing a POI of high importance along with the composite representation after the navigation application has determined to enter an alternate display mode for an ROI.

In some embodiments, the navigation application may present one or more POIs in addition to a composite representation when the one or more POIs have been identified of high importance. In some embodiments a POI can be identified to be of high importance when an importance value associated with the POI is above a threshold value. FIG. 4 illustrates an example sequence of screen images of GUI 400 for an electronic device 405 in displaying a POI icon representing a POI of high importance along with the composite representation after the navigation application has determined to enter an alternate display mode for an ROI.

Some embodiments may display a notation (e.g., a flag, a tag, a pin, a star, text) in addition to a composite representation when the map on the GUI has zoomed out to a certain zoom level. In FIG. 4, stages 445 and 450 are similar to stages 345 and 350 in FIG. 3. At stage 455 in FIG. 4, a pin 410 can be displayed along with composite representation 475 when the alternate display mode for ROI 440 has been triggered.

In this instance, the alternate display mode for ROI 440 can be triggered when POI icons 415-435 overlap each other beyond a threshold amount (e.g., 70% overlap between two or more icons, 40% overlap among three or more icons). In some embodiments, the alternate display mode can be triggered when only two icons overlap more than a threshold amount. In certain embodiments, the alternate display mode can be triggered when more than two icons overlap beyond another threshold amount.

Some embodiments may display one or more notations along with the composite representation in the alternate display mode when one or more POIs have been determined to have an importance value that exceeds a threshold value. In some embodiments, a POI icons representing a particular POI may be displayed regardless of its importance value. Those POI icons can be preset by a user or preconfigured by a system administrator. In some embodiments, those POIs can be identified by category or by name of the POI. For instance, a user may configure the system preferences such that a pin identification may appear in any region with a bookstore regardless of whether the region is being displayed in the alternate display mode. In another instance, the user may specify specific stores such as Target® to have an identification or notation whenever it is within the map's range.

Some embodiments can create a composite representation that identifies categories of services available in an area. In some embodiments, a composite representation can include icons representing different types of services available in a ROI. The navigation application in some embodiments may generate and display the composite representation when the ROI is displayed at a zoom level lower than a threshold. In some embodiments, the navigation application can generate and display the composite representation for the ROI when the display size of the ROI is below a threshold value (e.g., 32×32 pixel grid) or below a threshold percentage (e.g., 3%) of the graphical user interface.

In some embodiments, the navigation application may opt to identify categories of services available in an area when the navigation application is in a travel or tourist mode. Instead of displaying icons representing individual brands of stores and restaurants, the navigation application in tourist/travel mode identifies those service categories that might interest a traveler the most, such as restroom services, gas services, etc. In this example, the navigation application may automatically detect that the user is in a tourist/travel mode when the user is not in an area that is near home or when the user is in an area that the user has not frequented in the past. The navigation application may then generate a composite representation that would be most useful to a traveler when the map is being viewed at or exceeding a threshold map scale (or zoom level).

Figure 5:
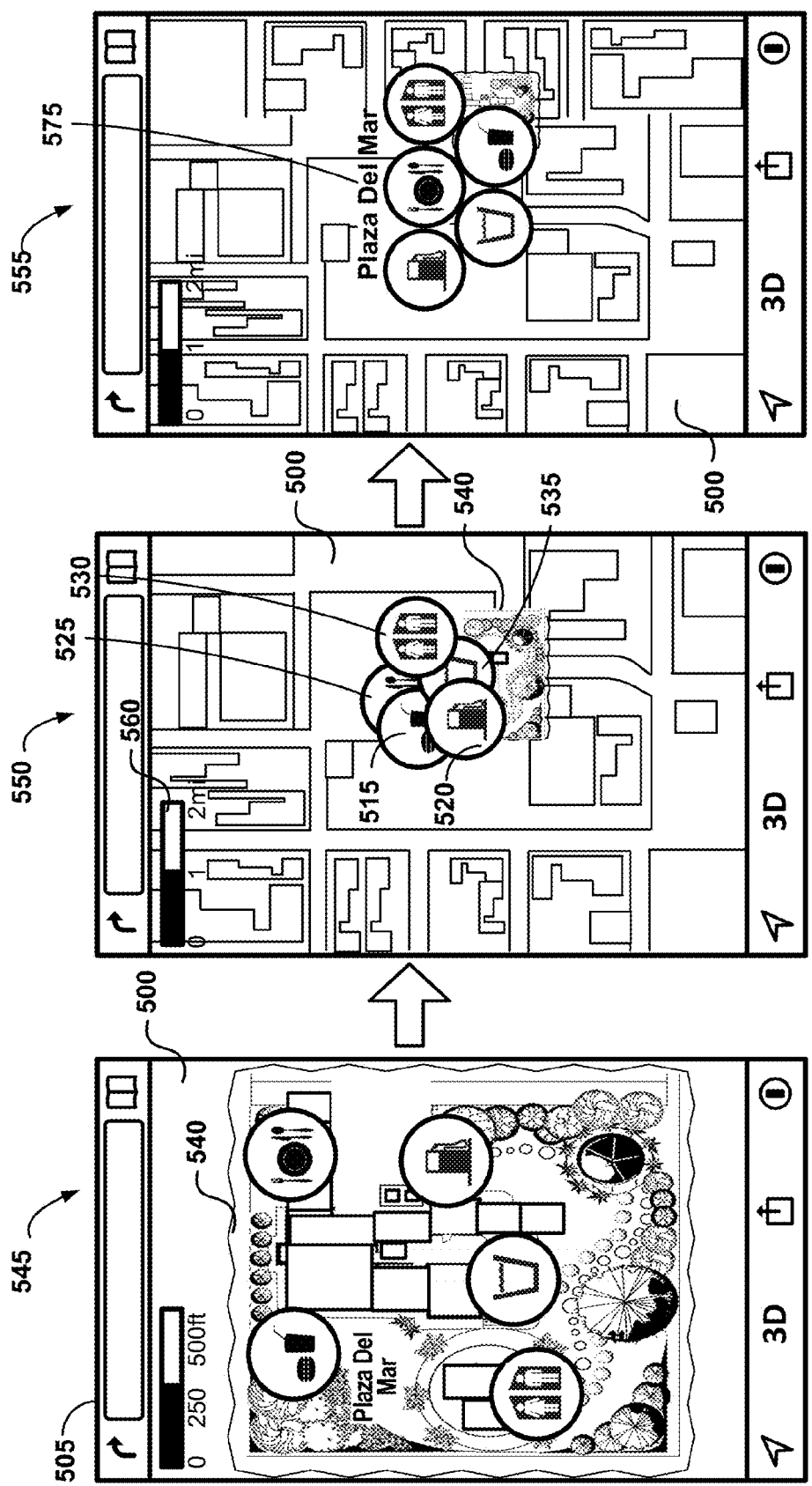
FIG. 5 illustrates an example sequence of screen images of a GUI for an electronic device in displaying a composite representation including icons representing service categories available at a ROI after the navigation application has determined to enter an alternate display mode for the ROI.

FIG. 5 illustrates an example sequence of screen images of GUI 500 for an electronic device 505 in displaying a composite representation including icons representing service categories available at a ROI 540 after the navigation application has determined to enter an alternate display mode for the ROI. As shown in stage 545, a plaza is visible on GUI 500. The plaza is an ROI that the user is currently viewing. Within the plaza, there are several facilities including stores, fuel stations, restrooms, and restaurants. In certain zoom levels, GUI 500 may present individual icons for each of the stores and restaurants available at the plaza.

In stage 550, the user has caused the map to zoom out such that ROI 540 is below a threshold size or percentage of the displayed map. The map scale is adjusted as shown in map scale indicator 560. Icons 515-535 representing different service categories appear to be overlapping as ROI 540 is zoomed out. In some examples, only two icons associated with the ROI may be overlapping while several other icons may not be overlapping.

In stage 555, the navigation application enters an alternate display mode for the ROI 540 such that icons 515-535 are no longer overlapping or colliding. The navigation application displays composite representation 575 that includes icons 515-535. The icons are displayed in a side-by-side manner in one or more rows where the icons are readily visible to the user. In some instances, the icons displayed as part of composite representation may overlap minimally for aesthetic reasons (e.g., below a threshold percentage such as 5%). In certain embodiments, the icons are displayed in an order based on the relative importance of their respective POIs. In some embodiments, icons of POIs corresponding to different service categories can be displayed in different rows. For example, icons of different types of restaurants (e.g., Joe's Burgers, Sally's diner) may be displayed in a first row while icons of different types of pharmacies (e.g., Walgreens, Rite Aid) may be displayed in another row.

In some embodiments, ROI 540 can have more than five service categories. The navigation application may identify those service categories that may be of high interest to a travel in some embodiments when the navigation application is in a travel mode. In certain embodiments, the navigation application may identify those service categories that may be of high interest to a user based on the user's past activities and behavior. For example, if the user typically stops in a lot of locations for coffee or restrooms, then navigation application may identify those categories of having higher importance values. Thus, navigation application may include those service icons when generating and presenting the composite representation. Some embodiments may also present icons in the composite representation in an order based on an importance value associated with each of the icons.

Some embodiments can identify POIs that the user has high interest in based on the frequency of past visits, how recent the visits were, the amount of time spent at each POI, the number of times that the user visits a website associated with the POI, or any other software apps associated with a POI that the user has on the user's device, etc. The navigation application may then consider the user's interest in generating and causing the composite representation to be displayed on the user's device. In some embodiments, the navigation application may be in a shopping mode where the navigation application may identify POIs that may be of high interest to the user when the user is shopping.

Figure 6:
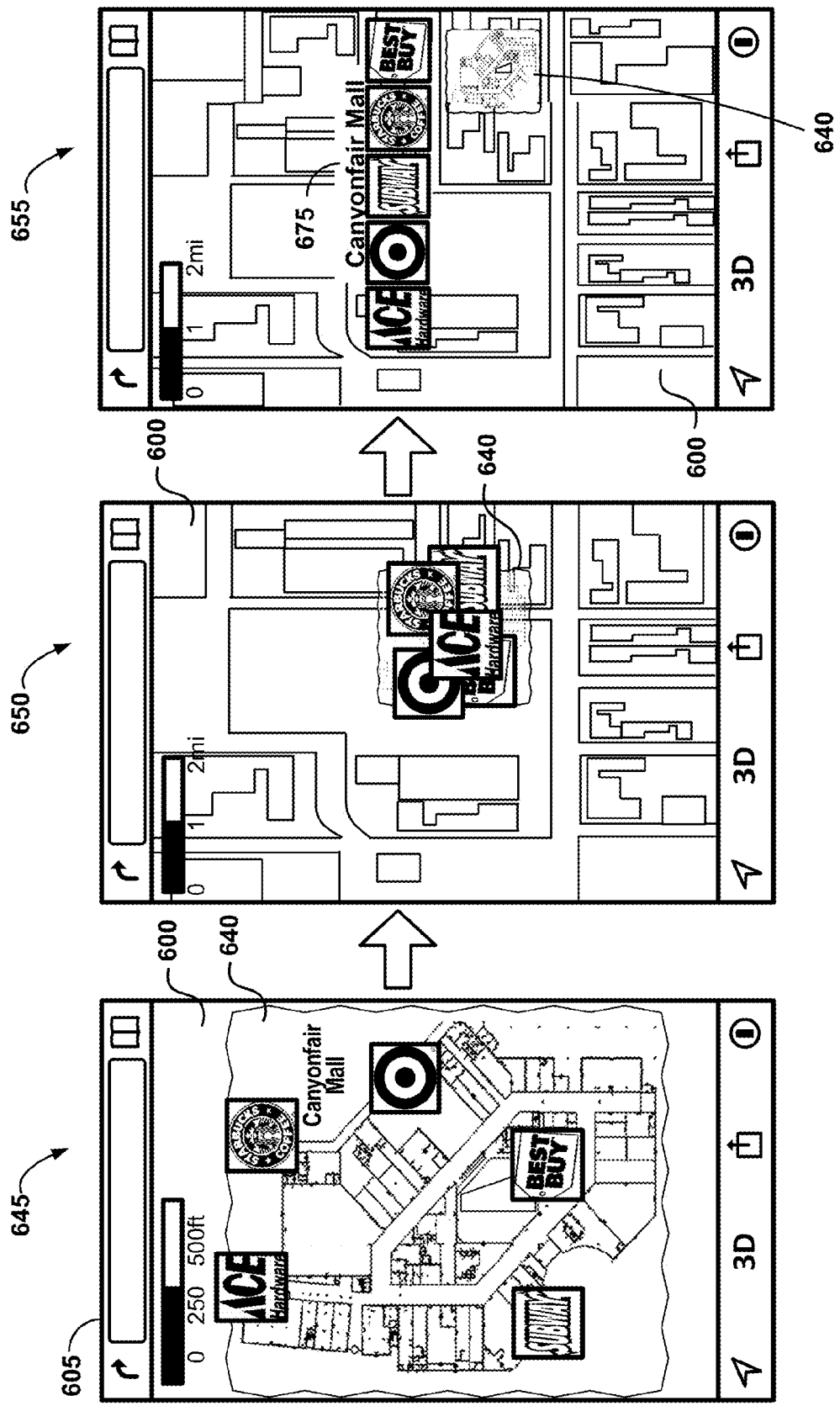
FIG. 6 illustrates an example sequence of screen images of a GUI for an electronic device in displaying a composite representation after the navigation application has determined to enter an alternate display mode for an ROI.

FIG. 6 illustrates an example sequence of screen images of GUI 600 for an electronic device 605 in displaying a composite representation after the navigation application has determined to enter an alternate display mode for an ROI. At stage 645, ROI 640 that corresponds to a shopping mall can be displayed. One or more icons representing different POIs within ROI 640 can be displayed. At stage 650, the zoom level decreases such that the user can get a more comprehensive bird's eye view of the area. At stage 655, the zoom level decreases slightly further compared to stage 650. The navigation application presents composite representation 675 when the alternate display mode has been triggered for ROI 640. In this example, composite representation includes five icons that represent five different specific stores available at the mall.

As described, the navigation application can assign importance values to each store based on the user's activity history and preferences (preconfigured and/or learned preferences). The preferences can be indicated by one or more selections or identifications of interest by the user. Upon determining those POIs of high interest to the user based on the importance values, the navigation application can generate composite representation that includes five of the stores with the highest importance values compared to the rest of the stores in ROI 640 that may be of interest to the user. Some embodiments may only select those POIs that have importance values exceeding a threshold value for presentation to the user.

III. Flow for Generating a Composite Representation

In some embodiments, the map service (also referred to as navigation service or mapping service) can generate a composite representation for display on a client device when an overcrowding of POI icons may occur. By generating a composite representation for display, a user may readily recognize the relevant POIs within a region without having to zoom in. In certain embodiments, the map service may identify POIs within a ROI that may be of high interest to the user and use POI icons corresponding to those POIs in the generation of the composite representation. As such, the most relevant POIs within a region may be identified to the user in a clear and efficient manner.

Figure 7:
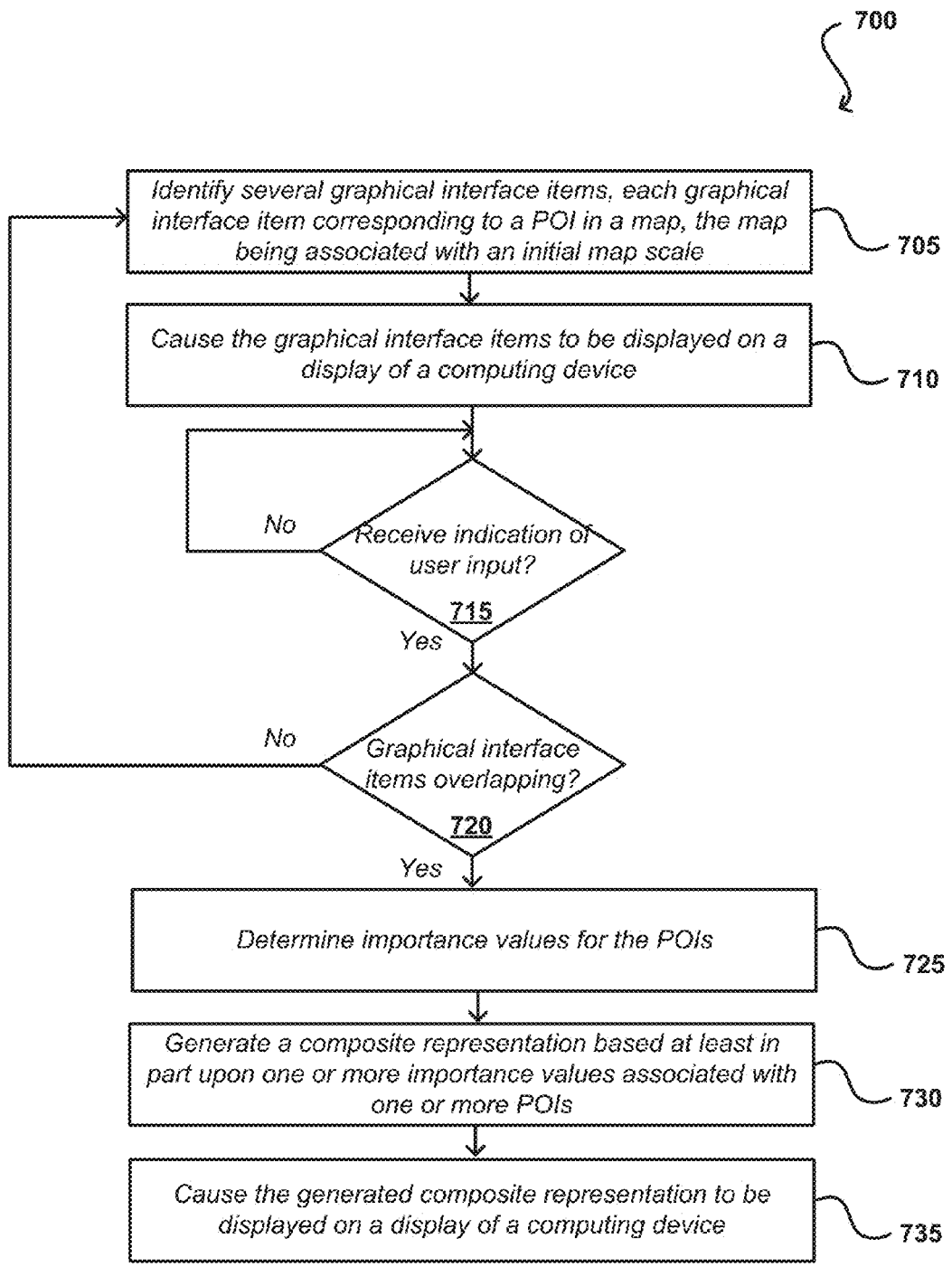
FIG. 7 is a flow diagram of illustrative process of some embodiments for generating a composite representation of multiple POI icons when POI icons within an ROI may be colliding or overlapping.

FIG. 7 is a flow diagram of illustrative process 700 of some embodiments for generating a composite representation of multiple POI icons when POI icons within an ROI may be colliding or overlapping. The navigation application in some embodiments may cause the composite representation to be displayed on a display of a computing device. In some embodiments, process 700 can be performed by a server system such as one or more map servers. In certain embodiments, process 700 can be performed by a combination of client and server devices.

At block 705, process 700 can determine several graphical interface items where each graphical interface item corresponds to a POI. Upon launching a navigation application, the computing device can send a position or an ROI of the computing device (e.g., a current location, a last-searched location, a newly-searched location, etc.) to a map server and the map server can identify map information including graphical interface items corresponding to different POIs. In some embodiments, a location or an ROI can include multiple POIs or can be associated with a number of POIs. For instance, the user may be located in a shopping mall where there are multiple stores as POIs within the region. In certain embodiments, the map information can include map image information for rendering the map on the display.

At block 710, process 700 can cause the graphical interface items to be displayed on a display of a computing device. In some embodiments, the graphical interface items can include a POI icon, a text label, a symbol, additional information on a POI, or a combination of these. The server may cause a POI to be differently displayed on a computing device based on a zoom level or a preference level in some embodiments. For instance, the server may cause the device to display a graphical interface item including a text label, ratings on a location, and a logo when the zoom level is fairly high. In another instance, the server may cause the device to display a graphical interface item including merely a logo when the zoom level is low. Different embodiments may cause the graphical interface items to be displayed differently.

At block 715, process 700 can determine whether an indication of a gesture input has been received at the computing device. If an indication of a gesture input has not been received, then the determination is made again. In some embodiments, a client device can detect whether a gesture input directed at the client device has been received and send the indication that a gesture input has been received to one or more map servers. In certain embodiments, the gesture input can be a pan, a rotate, a zoom, or other type of input. In some embodiments, the map server can receive an indication of a change in the map scale from an initial map scale to a new map scale.

If an indication of a gesture input has been received, then at block 720, process 700 can determine whether graphical interface items are overlapping. Some embodiments may determine that graphical interface items are overlapping when a pixel distance between two graphical interface items (e.g., a center of the graphical interface item, a center of a logo of a graphical interface item, or the edges of the graphical interface items) is less than a threshold distance. In some embodiments, the graphical interface items can be determined to be overlapping when more than two or more graphical interface items are overlapping for over a threshold percentage. Different embodiments may identify whether the graphical interface items are considered to be overlapping. If the graphical interface items are not determined to be overlapping, process 700 can return to block 705 and determine several graphical interface items corresponding to different POIs.

In certain embodiments, instead of determining whether graphical interface items are colliding or overlapping, process 700 may determine whether a particular zoom level (or map scale) has been reached. In some embodiments, if process 700 determines that the gesture input is a zoom operation, then process 700 may determine whether the new zoom level is below a threshold value. As described, an alternate display mode for the ROI can be triggered when two or more icons associated with the multiple POIs collide or overlap. In some embodiments, the alternate display mode for an ROI can be triggered when the zoom level is at or below a threshold level. In certain embodiments, the threshold level at which the alternate display mode can be triggered may be different for different POIs. For instance, the alternate display mode for an ROI may be triggered at a threshold value higher than for another ROI.

If the graphical interface items are determined to be overlapping, at block 725, process 700 can determine an importance value for each POI. In some embodiments, the navigation application can calculate an importance value for a POI by assessing whether this POI has been frequently visited by the user in the past, whether this POI is a type of establishment that the user generally visits, whether the POI is related to a navigation mode that the navigation application is currently under, whether this is a generally popular POI for the public, whether the system administrator has identified this POI as one of high interest or importance. The importance value for a POI can be determined differently in each embodiment.

At block 730, process 700 can generate a graphical representation to be displayed on the user's device. In some embodiments, the navigation application can prioritize the POIs based on their importance values. The graphical representation can include icons representing different POIs in an order with descending importance values.

At block 735, process 700 can cause the generated composite representation to be displayed on a display of the computing device. In some embodiments, upon generating the composite representation, the map server can send data associated with the composite representation to the computing device and cause the composite representation to be rendered on the display of the computing device. As described, the composite representation for an ROI can include several icons or logos associated with multiple POIs when the alternate display mode is triggered for the ROI.

In some embodiments, the generated composite representation is only displayed when the zoom level is at or below a threshold level. When the zoom level is readjusted to be above a certain threshold level, the navigation application may no longer display the composite representation. Further, in some embodiments, when the zoom level is at or below another threshold level, the navigation application may display another composite representation for the ROI. This other composite representation may include POI icons or graphical logos for POIs that have importance values above another threshold value.

IV. Electronic System

Many of the above-described features and applications are implemented as software processes that are specified as a set of instructions encoded on a computer readable storage medium. When these program instructions are executed by one or more computational or processing unit(s) (e.g., one or more processors, cores of processors, or other processing units), the program instructions cause the processing unit(s) to perform the actions indicated by the instructions. Examples of computer readable storage media include, but are not limited to, CD-ROMs, flash drives, random access memory (RAM) chips, hard drives, erasable programmable read-only memories (EPROMs), electrically erasable programmable read-only memories (EEPROMs), etc. The computer readable storage media do not include carrier waves and electronic signals passing wirelessly or over wired connections.

In this specification, the term "software" refers generally to sequences of instructions that, when executed by the processing unit(s) cause one or more computer systems to perform various operations, thus defining one or more specific machine implementations that execute and perform the operations of the software programs. "Software" can include firmware residing in read-only memory or applications stored in magnetic storage which can be read into memory for processing by one or more processors. In some embodiments, multiple software inventions can be implemented as sub-parts of a larger program while remaining distinct software inventions. In certain embodiments, multiple software inventions can also be implemented as separate programs. Any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 8:
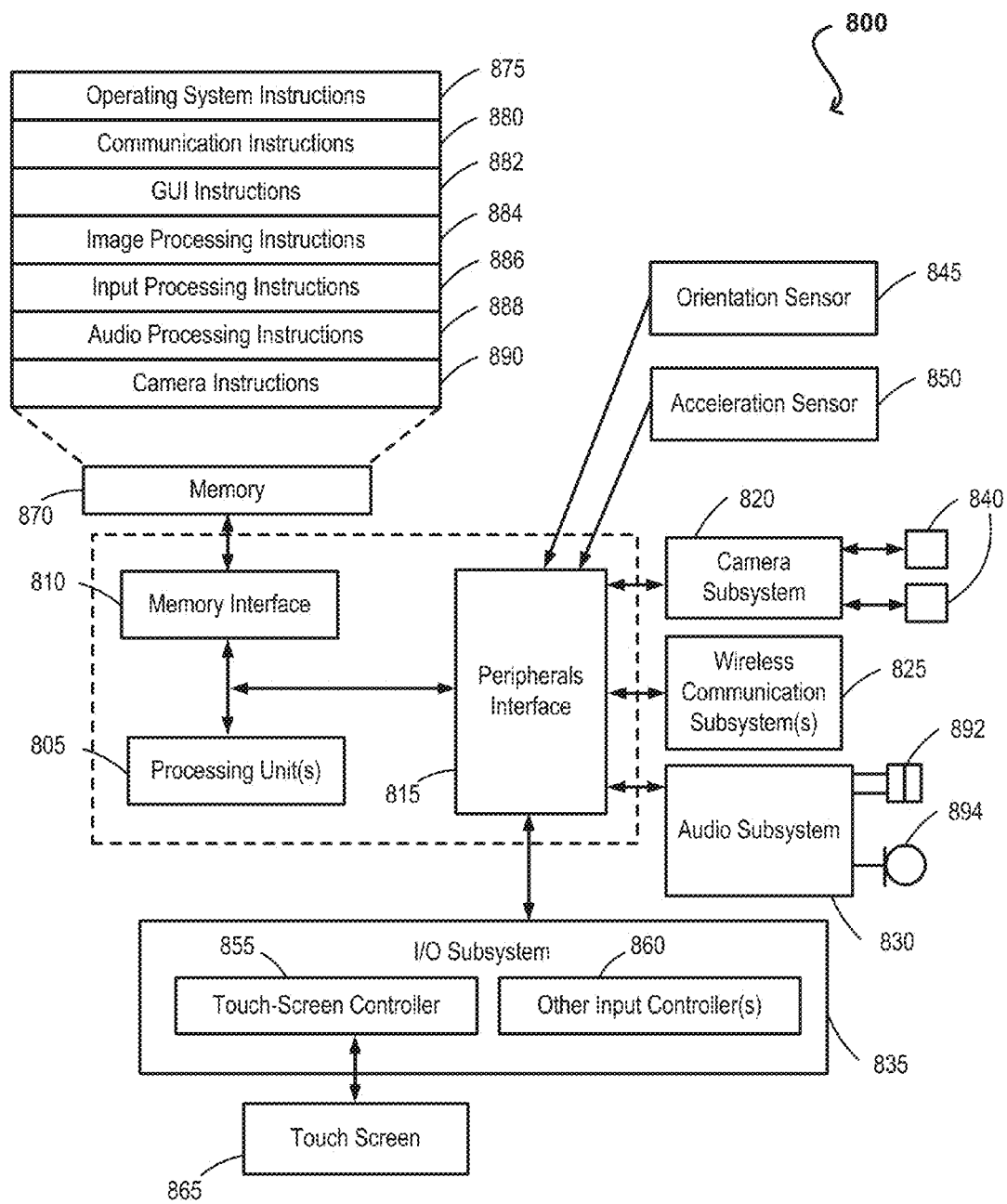
FIG. 8 is a simplified block diagram of a computer system such as a mobile computing device that may incorporate components of the system in FIG. 1 according to some embodiments.

In certain embodiments, the navigation application can operate on a mobile computing device such as a smartphone or a tablet. FIG. 8 is a simplified block diagram of a computer system such as a mobile computing device 800 that may incorporate components of the system in FIG. 1 according to some embodiments. Additional examples of mobile computing devices can include laptops, personal digital assistants (PDAs), set-top boxes, etc. Mobile computing device 800 includes one or more processing units 805, a memory interface 810, and a peripherals interface 815.

Peripherals interface 815 is coupled to various sensors and subsystems, including camera subsystem 820, wireless communication subsystem(s) 825, audio subsystem 830, I/O subsystem 835, etc. Peripherals interface 815 enables communication between processing unit(s) 805 and various peripherals. For example, orientation sensor 845 (e.g., a gyroscope) and acceleration sensor 850 (e.g., an accelerometer) are coupled to peripherals interface 815 to facilitate orientation and acceleration functions.

Camera subsystem 820 is coupled to one or more optical sensors 840 (e.g., a charged coupled device (CCD) optical sensor, a complementary metal-oxide semiconductor (CMOS) optical sensor, etc.). Camera subsystem 820 coupled with optical sensors 840 facilitates camera functions, such as image and/or video data capturing. Wireless communication subsystem 825 serves to facilitate communication functions. In some embodiments, wireless communication subsystem 825 includes radio frequency receivers and transmitters and optical receivers and transmitters (not shown here). These receivers and transmitters can be implemented to operate over one or more communication networks such as a GSM network, a Wi-Fi network, a Bluetooth network, etc. Audio subsystem 830 is coupled to speaker 892 to output audio (e.g., navigation instructions). Audio subsystem 830 can also be coupled to microphone 894 to facilitate voice-enabled functions (e.g., voice recognition for commands, digital recording, etc.).

I/O subsystem 835 involves the transfer between I/O peripheral devices (e.g., a display, a touchscreen, etc.) and the data bus of processing unit(s) 805 through peripherals interface 815. I/O subsystem 835 can include touchscreen controller 855 and other input controllers 860 to facilitate the transfer between I/O peripheral devices and the data bus of processing units 805. As shown, touchscreen controller 855 can be coupled to touchscreen 865. Touchscreen controller 855 can detect contact and movement on touchscreen 865 using any of multiple touch sensitivity technologies. Other input controllers 860 can be coupled to other I/O devices, such as one or more buttons. Some embodiments include a near-touch sensitive screen and a corresponding controller that can detect near-touch interactions instead of or in addition to touch interactions.

Memory interface 810 can be coupled to memory 870. In some embodiments, memory 870 can include volatile memory (e.g., high-speed RAM), non-volatile memory (e.g., flash memory), and/or any other types of memory or a combination thereof. As shown in FIG. 8, memory 870 can store operating system (OS) 875. OS 875 can include instructions for handling basic system services and instructions for performing hardware dependent tasks.

Memory 870 can also include communication instructions 880 to facilitate communicating with one or more devices, graphical user interface instructions 882 to facilitate graphical user interface processing, image processing instructions 884 to facilitate image-related processing and functions, input processing instructions 886 to facilitate input-related (e.g., touch input) processes and functions, audio processing instructions 888 to facilitate audio-related processing and functions, and camera instructions 890 to facilitate camera-related processes and functions. The instructions described above are merely exemplary and memory 870 can include addition and/or other instructions in some embodiments. For instance, the memory for a smartphone may include additional phone instructions to facilitate phone-related processes and functions. The memory may also include instructions for a navigation application as well as other applications. The described instructions need not be implemented as separate software programs or modules. Various functions of the mobile computing device can be implemented in hardware and/or in software, including in one or more signal processing and/or application specific integrated circuits.

While the components illustrated in FIG. 8 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will recognize that the functions described with respect to FIG. 8 may be separated into two or more integrated circuits.

B. Electronic System

Figure 9:
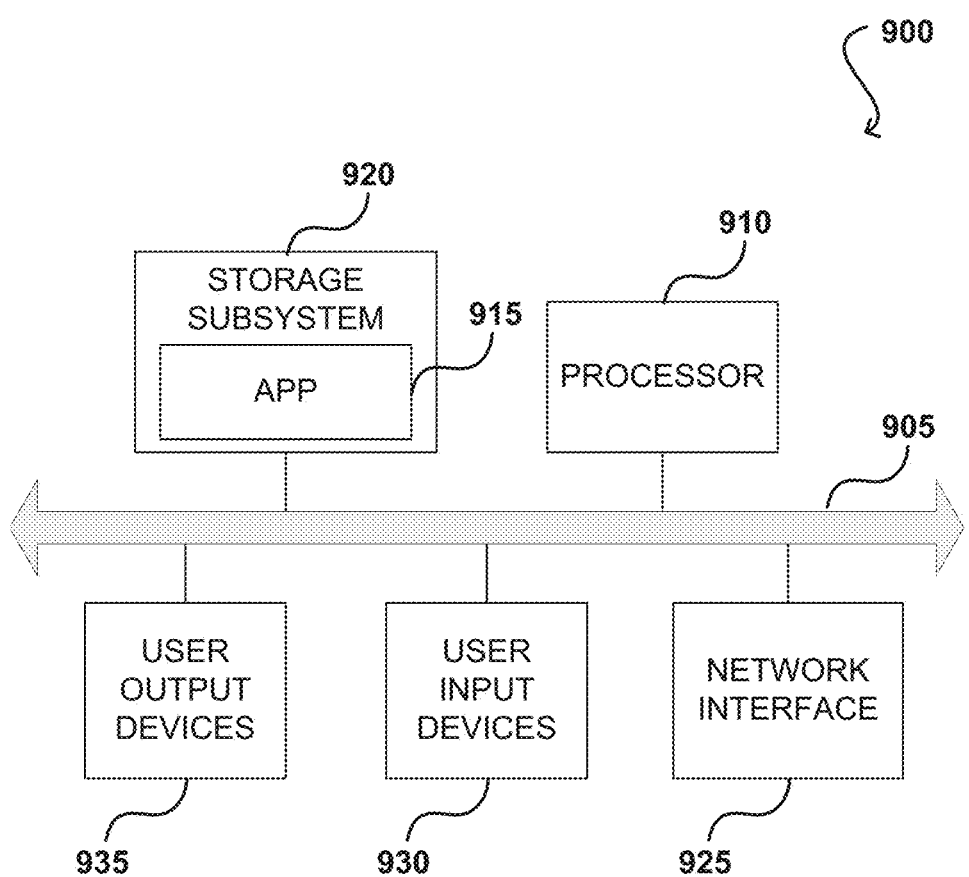
FIG. 9 illustrates another example of an electronic system with which some embodiments of the invention can be implemented.

FIG. 9 illustrates another example of an electronic system 900 with which some embodiments of the invention can be implemented. Electronic system 900 can be implemented as any of various computing devices, including, e.g., a desktop computer, a laptop computer, a tablet computer, a phone, a PDA, or any other type of electronic or computing device, not limited to any particular form factor. Such an electronic system can include various types of computer readable media and interfaces for various other types of computer readable media. Electronic system 900 can include bus 905, processing unit(s) 910, storage subsystem 920, network interface 925, input devices 930, and output devices 935.

Processing unit(s) 910 can include a single processor, which can have one or more cores, or multiple processors. In some embodiments, processing unit(s) 910 can include a general-purpose primary processor as well as one or more special-purpose co-processors such as graphics processors, digital signal processors, or the like. In some embodiments, some or all processing units 910 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 910 can retrieve and execute instructions stored in storage subsystem 920.

Storage subsystem 920 can include various memory units such as a system memory, a read-only memory (ROM), and a permanent storage device. The ROM can store static data and instructions that are needed by processing unit(s) 910 and other modules of electronic device 900. The permanent storage device can be a read-and-write memory device. This permanent storage device can be a non-volatile memory unit that stores instructions and data even when computer system 900 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 920 can include any combination of computer readable storage media including semiconductor memory chips of various types (DRAM, SRAM, SDRAM, flash memory, programmable read-only memory) and so 920 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 920 can store one or more software programs to be executed by processing unit(s) 910, such as an application 915. As mentioned, "software" can refer to sequences of instructions that, when executed by processing unit(s) 910 cause computer system 900 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 920, processing unit(s) 910 can retrieve program instructions to execute and data to process in order to execute various operations described herein.

A user interface can be provided by one or more user input devices 930 and user output devices 935 such as a display. Input devices 930 can include any device via which a user can provide signals to computing system 900; computing system 900 can interpret the signals as indicative of particular user requests or information. In various embodiments, input devices 930 can include any or all of a keyboard touch pad, touch screen, mouse or other pointing device, scroll wheel, click wheel, dial, button, switch, keypad, microphone, and so on.

User output devices 935 can include a display that displays images generated by electronic device 900 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of a display. Examples include indicator lights, speakers, tactile "display" devices, printers, and so on.

In some embodiments, user output devices 935 can provide a graphical user interface, in which visible image elements in certain areas of user output devices 935 such as a display are defined as active elements or control elements that the user selects using user input devices 930. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in the display. Other user interfaces can also be implemented.

Network interface 925 can provide voice and/or data communication capability for electronic device 900. In some embodiments, network interface 925 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 925 can provide wired network connectivity (e.g., Ethernet) in addition to or instead of a wireless interface. Network interface 925 can be implemented using a combination of hardware (e.g., antennas, modulators/demodulators, encoders/decoders, and other analog and/or digital signal processing circuits) and software components.

Bus 905 can include various system, peripheral, and chipset buses that communicatively connect the numerous internal devices of electronic device 900. For example, bus 905 can communicatively couple processing unit(s) 910 with storage subsystem 920. Bus 905 also connects to input devices 930 and user output devices 935. Bus 905 also couples electronic device 900 to a network through network interface 925. In this manner, electronic device 900 can be a part of a network of multiple computer systems (e.g., a local area network (LAN), a wide area network (WAN), an Intranet, or a network of networks, such as the Internet. Any or all components of electronic device 900 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 910 can provide various functionality for electronic device 900. For example, processing unit(s) 910 can execute application 915 that can provide various functionality such as the ability to determine whether an alternate display mode has been triggered (e.g., from an overlapping of two or more icons, from a zoom level falling below a threshold level), the ability to generate a composite representation representing multiple POIs associated with an ROI, the ability to display the composite representation to a user, and so on. In some embodiments, application 915 can cause a graphical composite representation to be readily presented to a user by user output device 935 when POI icons for multiple POIs within an ROI begin to overlap or collide.

It will be appreciated that computer system 900 is illustrative and that variations and modifications are possible. Computer system 900 can have other capabilities not specifically described here (e.g., global positioning system (GPS), power management, one or more cameras, various connection ports for connecting external devices or accessories, etc.). Further, while computer system 900 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

V. Map Service Environment

Figure 10:
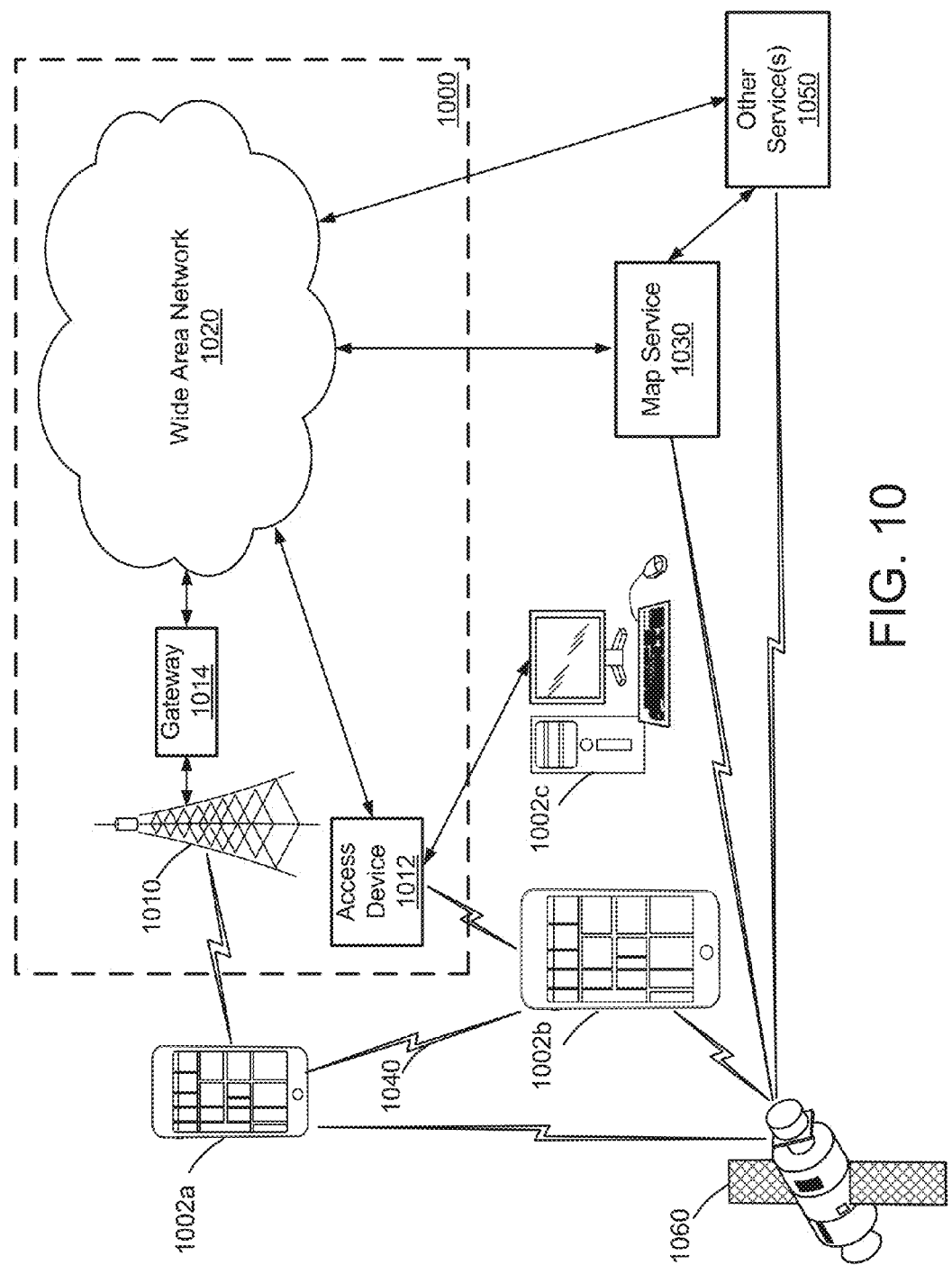
FIG. 10 illustrates a map service operating environment in accordance with some embodiments.

Various embodiments may operate within a map service operating environment. FIG. 10 illustrates a map service operating environment 1000 in accordance with some embodiments. A map service 1005 (also referred to as navigation service) can provide map services for one or more client devices 1010a-1010c in communication with map service 1005 through various communication methods and protocols. Map service 1005 can provide map information and other map-related data, such as two-dimensional map image data (e.g., aerial view of roads using satellite imagery), three-dimensional map image data (e.g., traversable map with three-dimensional features such as buildings), route and direction calculations (e.g., ferry route calculations or directions between two points for a pedestrian), real-time navigation data (e.g., turn-by-turn visual navigation between two points for a pedestrian), real-time navigation data (e.g., turn-by-turn visual navigation data in two or three dimensions), location data (e.g., where the client device is currently located), and other geographic data (e.g., wireless network coverage, weather conditions, traffic information, or nearby POIs). In various embodiments, the map service data may include localized labels for different countries or regions. Localized labels can be used to present map labels (e.g., street names, city names, POIs) in different languages on client devices. Client devices 1010a-1010c may use these map services by obtaining map service data. Client devices 1010a-1010c can implement various techniques to process map service data. Client devices 1010a-1010c can then provide map services to various entities, including, but not limited to, users, internal software or hardware modules, and/or other systems or devices external to client device 1010a-1010c.

In some embodiments, a map service is implemented by one or more nodes in a distributed computing system. Each node may be assigned one or more services or components of a map service. Some nodes may be assigned the same map service or component of a map service. In some embodiments, a load balancing node can distribute access or requests to other nodes within a map service. In certain embodiments, a map service can be implemented as a single system, such as a single server. Different modules or hardware devices within a server may implement one or more of the various services provided by the map service.

A map service in some embodiments can generate map service data in various formats to provide map services. In some embodiments, one format of map service data is map image data. Map image data can be provided to a client device so that the client device can process the image data (e.g., the rendering and/or display of image data as a two-dimensional or three-dimensional map). Map image data, whether in two- or three-dimensions, can specify one or more map tiles. A map tile can be a portion of a larger map image. Assembling the map tiles of a map produces the original map. Tiles may be generated from map image data, routing or navigation data, or any other map service data. In some embodiments, map tiles are raster-based map tiles, with tile sizes ranging from any size both larger and smaller than a commonly used 256 pixel× 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport using various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments, map tiles are analyzed for complexity, according to vector-based graphic techniques, and constructed using complex and non-complex layers. Map tiles can also be analyzed for common image data or patterns that may be rendered as image textures and constructed by relying on image masks. In some embodiments, raster-based image data in a map tile contains certain mask values, which are associated with one or more textures. Some embodiments can also analyze map tiles for specified features that may be associated with certain map styles that contain style identifiers.

Other map services can generate map service data relying upon various data formats separate from a map tile. For instance, map services that provide location data may use data formats conforming to location service protocols, such as, but not limited to, Radio Resource Location services Protocol (RRLP, TIA 801 for Code Division Multiple Access (CDMA), Radio Resource Control (RRC) position protocol, or LTE Positioning Protocol (LPP). Certain embodiments may also receive or request data from client devices identifying device capabilities or attributes (e.g., hardware specifications or operating system version) or communication capabilities (e.g., device communication bandwidth as determined by wireless signal strength or wire or wireless network types).

A map service may obtain map service data from internal or external sources. For instance, satellite imagery used in map image data may be obtained from external services, or internal systems, storage devices, or nodes, etc. Other examples may include, but are not limited to, GPS assistance servers, wireless network coverage databases, business or personal directories, weather data, government information (e.g., construction updates or road name changes), or traffic reports. A map service in some embodiments may update map service data (e.g., wireless network coverage) for analyzing future requests from client devices.

Various embodiments of a map service may response to client device requests for map services. These requests may be for a specific map(s) or portions of a map. Some embodiments can format requests for a map as requests for certain map tiles. In some embodiments, requests can also supply the map service with starting locations (or current locations) and destination locations for a route calculation. A client device can also request map service rendering information, such as map textures or style sheets. In at least some embodiments, requests are also one of a series of requests implementing turn-by-turn navigation. Requests for other geographic data may include, but are not limited to, requests for current location, wireless network coverage, weather conditions, traffic information, or nearby POIs.

In some embodiments, a map service can analyze client device requests to optimize a device or map service operation. For instance, a map service may recognize that the location of a client device is in an area of poor communications (e.g., weak wireless signal) and send more map service data to supply a client device in the event of loss of communication or send instructions to use different client hardware (e.g., orientation sensors) or software (e.g., use wireless location services or Wi-Fi positioning instead of GPS-based services). In another example, a map service can analyze a client device request for vector-based map image data and determine that raster-based map data can better optimize the map image data according to the image's complexity. Embodiments of other map services may perform similar analysis on client device requests.

In certain embodiments, client devices (e.g., client device 1010a-1010c) can be implemented on different portable-multifunction device types. Client devices 1010a-1010c can use map service 1030 through various communication methods and protocols. In some embodiments, client devices 1010a-1010c can request or receive map service data. Client devices 1010a-1010c can then process map service data (e.g., render and/or display the data) and can send the data to another software or hardware module on the device or to an external device or system.

A client device in some embodiments can implement techniques to render and/or display maps. These maps may be requested or received in various formats, such as map tiles as described above. A client device may render a map in two-dimensional or three-dimensional views. In some embodiments, a client device can display a rendered map and allow a user, system or device providing input to manipulate a virtual camera in the map, changing the map display according to the virtual camera's position, orientation, and field-of-view. Various forms of input devices are implemented to manipulate a virtual camera. In some embodiments, touch input, through certain single or combination gestures (e.g., touch-and-hold or a swipe) can manipulate the virtual camera. Some embodiments allow manipulation of the device's physical location to manipulate a virtual camera. For instance, a client device may be tilted up from its current position to manipulate the virtual camera to rotate upward. In another instance, a client device may be tilted forward from its current position to move the virtual camera forward. Other input devices to the client device may include auditory input (e.g., spoken words), a physical keyboard, mouse, and/or joystick.

Some embodiments can provide various visual feedback to virtual camera manipulations, such as displaying an animation of possible virtual camera manipulations when transitioning from two-dimensional map views to three-dimensional map views. Some embodiments also allow input In some embodiments, a client device can implement a navigation system (e.g., turn-by-turn navigation) where the navigation system can provide directions or route information that can be displayed to a user. A client device can request directions or a route calculation from a map service. A client device can receive map image data and route data from a map service. In some embodiments, a client device can implement a turn-by-turn navigation system, which provides real-time routing and direction information based upon location information and route information received from a map service and/or other location systems, such as a Global Positioning System (GPS). A client device can display map image data that reflects a current location of the client device and update the map image data in real-time. A navigation system can also provide auditory and/or visual directions to a user for the user to follow a certain route.

A virtual camera can be implemented to manipulate navigation map data according to some embodiments. In some embodiments, the client device can adjust the virtual camera display orientation to bias toward the route destination. Some embodiments allow the virtual camera to navigate turns by simulating the inertial motion of a virtual camera.

Client devices can implement various techniques to utilize map service data from map service. Some embodiments implement techniques to optimize the rendering of two-dimensional and three-dimensional map image data. In some embodiments, a client device can locally store rending information. For instance, a client device can store a style sheet, which provides directions rendering for image data containing style identifiers. In another instance, common image textures can be stored to decrease the amount of map image data transferred from a map service. In some embodiments, client devices can implement various modeling techniques to render two-dimensional and three-dimensional map image data, examples of which include, but are not limited to, generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In some embodiments, the client devices also order or prioritize map service data in certain techniques. For instance, a client device can detect the motion or velocity of a virtual camera, which if exceeding certain threshold values, can load and render lower-detail image data for certain areas. Other instances include rendering vector-based curves as a series of points, preloading map image data for areas of poor communication with a map service, adapting textures based on display zoom level, rendering map image data according to complexity, etc.

In some embodiments, client devices can communicate using various data formats separate from a map tile. For instance, some client devices can implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 10 illustrates an embodiment of an operating environment 1000 for map service 1030 and client devices 1002a-1002c. In some embodiments, devices 1002a, 1002b, and 1002c communicate over one or more wire or wireless networks 1010, For example, wireless network 1010, such as a cellular network, can communicate with a wide area network (WAN) 1020, such as the Internet, by use of gateway 1014. Gateway 1014 can provide a packet oriented mobile data service, such as General Packet Radio Service (GPRS), or other mobile data service allowing wireless networks to transmit data to other networks, such as wide area network 1020. Likewise, access device 1012 (e.g., IEEE 802.11g wireless access device) provides communication access to WAN 1020. Devices 1002a and 1002b can be any portable electronic or computing device capable of communicating with a map service. Device 1002c can be any non-portable electronic or computing device capable of communicating with a map service.

In some embodiments, both voice and data communications are established over wireless network 1010 and access device 1012. For example, device 1002a can place and receive phone calls (e.g., using voice of Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1010, gateway 1014, and WAN 1020 (e.g., using Transmission Control Protocol/Internet Protocol (TCP/IP) or User Datagram Protocol (UDP)). Likewise, in some implementations, devices 1002b and 1002c can place and receive phone calls, send and receive e-mail messages, and retrieve electronic documents over access device 1012 and WAN 1020. In various embodiments, any of the illustrated client devices may communicate with map service 1030 and/or other service(s) 1050 using a persistent connection established in accordance with one or more security protocols, such as the Secure Sockets Layer (SSL) protocol or the Transport Layer Security (TLS) protocol.

Devices 1002a and 1002b can also establish communications by other means. For example, wireless device 1002a can communicate with other wireless devices (e.g., other devices 1002b, cell phones, etc.) over wireless network 1010. Likewise, devices 1002a and 1002b can establish peer-to-peer communications 1040 (e.g., a personal area network) by use of one or more communication subsystems, such as Bluetooth® communication. Device 1002c can also establish peer-to-peer communications with devices 1002a or 1002b. Other communication protocols and topologies can also be implemented. Devices 1002a and 1002b may also receive Global Positioning System (GPS) signals from GPS satellites 1060.

Devices 1002a, 1002b, and 1002c can communicate with map service 1030 over one or more wired and/or wireless networks, 1012 or 1010. For example, map service 1030 can provide map service data to rendering devices 1002a, 1002b, and 1002c. Map service 1030 may also communicate with other services 1050 to obtain data to implement map services. Map service 1030 and other services 1050 may also receive GPS signals from GPS satellites 1060.

In various embodiments, map service 1030 and/or other service(s) 1050 can be configured to process search requests from any of the client devices. Search requests may include but are not limited to queries for businesses, addresses, residential locations, POIs, or some combination thereof. Map service 1030 and/or other service(s) 1050 can be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular POI) has been requested, a measure of quality associated with the search result (e.g., highest user or editorial review rating), and/or the volume of reviews for the search results (e.g., the number of times the search result has been review or rated).

In various embodiments, map service 1030 and/or other service(s) 1050 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1030 and/or other service(s) 1050, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as POIs. In various embodiments, responsive to a user selection of one of these POIs (e.g., a touch selection, such as a tap), the multifunction device is configured to display additional information about the selected POI including but not limited to ratings, reviews or review snippets, hours of operation, store status (e.g., open for business, permanently closed, etc.), and/or images of a storefront for the POI. In various embodiments, any of this information may be displayed on a graphical information card that is displayed in response to the user's selection of the POI.

In various embodiments, map service 1030 and/or other service(s) 1050 can provide one or more feedback mechanisms to receive feedback from client devices 1002a-1002c. For instance, client devices may provide feedback on search results to map service 1030 and/or other service(s) 1050 (e.g., feedback specifying ratings, reviews, temporary or permanent business closures, errors etc.); this feedback may be used to update information about points of interest in order to provide more accurate or more up-to-date search results in the future. In some embodiments, map service 1030 and/or other service(s) 1050 may provide testing information to the client device (e.g., an A/B test) to determine which search results are best. For instance, at random intervals, the client device may receive and present two search results to a user and allow the user to indicate the best result. The client device may report the test results to map service 1030 and/or other service(s) 1050 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several subprocesses, or as part of a larger macro process. Thus, one of ordinary skill in the art would understand that the invention is not to be limited by the foregoing illustrative details, but rather is to be defined by the appended claims.

What is claimed is:

1. A computer-implemented method comprising:
   receiving, by a computing device, a plurality of graphical interface items, each of the plurality of graphical interface items corresponding to a point of interest (POI) on a map, wherein the map is associated with a first map scale;
   displaying the plurality of graphical interface items on a display of the computing device;
   receiving an input by a user that causes a change in the first map scale to a new map scale;
   determining that the plurality of graphical interface items are overlapping when the map is in the new map scale;
   in response to determining that the plurality of graphical interface items are overlapping, generating a composite representation including a plurality of POI icons representing a plurality of POIs; and
   displaying the composite representation on the display of the computing device, wherein the plurality of POI icons are displayed in an adjacent manner.

2. The method of claim 1 wherein the plurality of graphical interface items are determined to be overlapping when a number of pixels between at least two of the plurality of graphical interface items is below a threshold value.

3. The method of claim 1 wherein determining that the plurality of graphical interface items are overlapping includes determining a current zoom level associated with the computing device, wherein the plurality of graphical interface items are determined to be overlapping based on the current zoom level.

4. The method of claim 1 wherein displaying the plurality of POI icons in an adjacent manner includes displaying the plurality of POI icons in a row and wherein the composite representation further includes a label representing a region of interest (ROI) that is associated with the plurality of POIs.

5. The method of claim 1 further comprising:
   associating each of the POIs with an important level; and
   determining that a POI in the plurality of POIs has an importance level exceeding a threshold value, wherein a graphical interface item associated with the POI is displayed in addition to the composite representation when the plurality of graphical interface items are determined to be overlapping.

6. The method of claim 1 wherein a graphical interface item includes a POI icon and a label associated with the POI represented by the graphical interface item.

7. The method of claim 1 wherein the composite representation represents the plurality of POIs, wherein a first POI in the plurality of POIs is a first transit line at a transit station and a second POI in the plurality of POIs is a second transit line at the transit station, wherein the composite representation includes a label for the transit station, and wherein the composite representation further includes one or more icons being logos of the first transit line and the second transit line.

8. The method of claim 1 further comprising:
   associating each of the POIs with an importance level designated by the user; and
   displaying the graphical interface items corresponding to the POI's in an order based on the importance level designated by the user.

9. The method of claim 1 further comprising:
   determining an activity history of the user of the computing device;
   displaying the graphical interface items corresponding to the POI's in an order based on the activity history of the user.

10. A system comprising:
    one or more processors;
    a memory device coupled to the one or more processors, the memory device including a set of instructions to be executed, wherein the set of instructions, when executed by the one or more processors, causes the one or more processors to:
    receive a plurality of graphical interface items, each of the plurality of graphical interface items corresponding to a point of interest (POI) on a map, wherein the map is associated with a first map scale;
    display the plurality of graphical interface items on a display of a computing device;
    receive an input by a user that causes a change in the first map scale to a new map scale;
    determine that the plurality of graphical interface items are overlapping when the map is in the new map scale; and
    in response to determining that the plurality of graphical interface items are overlapping, generate a composite representation including a plurality of POI icons representing a plurality of POIs; and
    display the composite representation on the display of the computing device, wherein the plurality of POI icons are displayed in an adjacent manner.

11. The system of claim 10 wherein the plurality of graphical interface items are determined to be overlapping when a number of pixels between at least two of the plurality of graphical interface items is below a threshold value.

12. The system of claim 10 wherein determining that the plurality of graphical interface items are overlapping includes determining a current zoom level associated with the computing device, wherein the plurality of graphical interface items are determined to be overlapping based on the current zoom level.

13. The system of claim 10 wherein displaying the plurality of POI icons in an adjacent manner includes displaying the plurality of POI icons in a row and wherein the composite representation further includes a label representing a region of interest (ROI) that is associated with the plurality of POIs.

14. The system of claim 10 wherein the set of instructions further causes the one or more processors to perform the method comprising:

associating each of the POIs with an important level; and determining that a POI in the plurality of POIs has an importance level exceeding a threshold value, wherein a graphical interface item associated with the POI is displayed in addition to the composite representation when the plurality of graphical interface items are determined to be overlapping.

15. The system of claim 10 wherein a graphical interface item includes a POI icon and a label associated with the POI represented by the graphical interface item.

16. The system of claim 10 wherein the composite representation represents the plurality of POIs, wherein a first POI in the plurality of POIs is a first transit line at a transit station and a second POI in the plurality of POIs is a second transit line at the transit station, wherein the composite representation includes a label for the transit station, and wherein the composite representation further includes one or more icons being logos of the first transit line and the second transit line.

* * * * *